(12) United States Patent
Gutsche

(10) Patent No.: US 6,302,409 B1
(45) Date of Patent: Oct. 16, 2001

(54) ELEMENTS FOR A MAGNETIC TOOL HOLDER SYSTEM

(76) Inventor: Gunter Emil Gutsche, 4476 Forget, Terrebonne PQ (CA), J6X 1Z4

(*) Notice: Subject to any disclaimer, the term of this patent is extended or adjusted under 35 U.S.C. 154(b) by 0 days.

(21) Appl. No.: 09/393,380

(22) Filed: Sep. 10, 1999

(51) Int. Cl.[7] .................................................. B23B 31/107
(52) U.S. Cl. .......................... 279/128; 279/14; 279/143; 408/239 A
(58) Field of Search .................... 279/14, 128, 143–145; 408/239 A, 241 R

(56) References Cited

U.S. PATENT DOCUMENTS

| | | | |
|---|---|---|---|
| 2,224,480 | * | 12/1940 | Kartarik . |
| 3,023,015 | * | 2/1962 | Pankow . |
| 3,973,784 | * | 8/1976 | Smith . |
| 4,413,937 | * | 11/1983 | Gutsche ........................ 408/239 A |
| 4,525,111 | * | 6/1985 | Gutsche . |
| 5,470,180 | * | 11/1995 | Jore ..................................... 279/14 |
| 5,586,847 | * | 12/1996 | Mattern, Jr. et al. ............. 408/239 A |
| 5,722,805 | * | 3/1998 | Giffin . |
| 5,785,468 | * | 7/1998 | Peritz . |

FOREIGN PATENT DOCUMENTS

1178093 * 11/1984 (CA) .

* cited by examiner

*Primary Examiner*—Steven C. Bishop

(57) ABSTRACT

A quick-connect tool change system for hand drills comprising
- a) a first, two ended, magnetic bit holder element fitting a chuck,
- b) at least one second working tool element slidingly fitting over the first bit holder element and having retaining means, The first bit holder element can comprise a natural magnet or an electro magnet selectively energized from a direct current source. A hand drill with a means to provide and transmit electric current to the electro magnet is also provided.

18 Claims, 3 Drawing Sheets

ELEMENTS FOR A MAGNETIC TOOL HOLDER SYSTEM

The present invention relates to accessories for rotating hand tools and more particularly to removable tool elements including an magnetic component.

Rapid tool change on rotating hand tools such as drills is a desirable feature because often several successive operation are required to complete a particular work sequence. For example to fasten a hard wood work piece with a screw might require the drilling of a pilot hole, and a clearance hole, reaming a countersink chamfer and finally driving the screw. All this while aligning and holding two work pieces,

DESCRIPTION OF THE PRIOR ART

One method of rapid tool change is the use of a hand-tightening chuck However, users have found that the forward and backward action of repeated operations loosens the jaws' grip. It is very annoying to have work interrupted because a tool bit fell out of the chuck. Often it is also permanently lost. Also, there is the time required for the repeated change-over and tightening operations because one tool has to be removed to be able to insert the other. A variety of reversible tools have been proposed where an adaptor is held in the chuck and a dual ended tool with a screwdriver bit and a drill bit is alternately used by flipping the tool end over end. As an example is here cited U.S. Pat. No. 3,023,015 to Pankow. A version where the flip-over tool is detached from the adaptor is marketed by several manufacturers. All share the disadvantage of adding to the length of the overall system. Usually only one end of the tool holder is changeable and fully magnetized. Rodin in U.S. Pat. No. 3,484,114 endeavors to drive a tool with the holes of the chuck with a second tool held ready in the jaws. A number of attempts have been made to drive a second drill by means of the screw driver bit in the chuck. Two such devices are shown in U.S. Pat. No. 3,973,784 to Smith, U.S. Pat. No. 4,525,111 to Gutsche and U.S. Pat. No. 5,722,805 to Giffin, the latter using the familiar spring loaded blocking plate previously used in caulking guns and pipe clamps to secure the second tool and having four moving parts made up of seven components. The tools based on U.S. Pat. No. 4,413,937 to Gutsche and sold under the trade name Chuck-Mate use the sides of the chuck jaws to drive the second tool, in effect fitting two tools into the chuck at the same time. All these prior art devices have been cited to show how the here disclosed invention can enhance their performance. The present invention synergistically improves the above tools in the following manners: It shortens the length of dual-ended tools fitting into an adaptor by making the adaptor shaft hollow right to the end and thereby allowing the tool to reach deep into the chuck. The present invention's magnet combined with its two magnetized bits allows the tool to be held by magnetic force in the chuck, even if the jaws happen to have somewhat loosened, thus eliminating the possibility of unexpected tool loss. The Rodin, Giffin and other devices can be simplified by synergistically using the magnet's force to accomplish the above mentioned tasks and simultaneously helping to actuate the retaining mechanism of the additional tool.

SUMMARY OF THE INVENTION

It is therefore the object of the present invention to provide a quick-change tool element wherein at least two or more working tools are simultaneously attracted, held and served by one magnet.

A further object of the invention is to prevent loss of tool elements from the chuck of a hand drill where the grip of the jaws has somewhat slackened by bringing a magnetized bit into contact with the interior of the drill, while simultaneously holding a screw or other object by magnetism at the other, exposed end of the tool element.

A further object of the invention is to economically provide a strongly magnetized element for a tool system that will synergistically fulfill five magnetic functions.

Another object of the invention is to provide a shortened quick change tool system by devising a hollow-shafted adaptor with a deep or through hole that allows longer tool elements to disappear deep into the chuck.

A further object of the invention is to provide a quick change tool system with a reduced number of loose bits by using a dual-ended, dual-magnetized basic element.

A further object of the invention is to provide a magnetic bit holder with an electro-magnet, giving the operator the possible choice to activate or de-activate the retaining means of the various elements by use of a switch operated by the one hand also holding the drill.

Another object of the invention is to provide a hand drill that is adapted to allow the operator to selectively retain slide-on tools by means of current provided from the hand drill.

Another object of the invention to provide both the fastest, most versatile and least costly tool change systems for hand drills.

The objects of the present invention are accomplished by the following preferred embodiments:

In one embodiment there is provided an first element for a tool system with an elongated member that is adapted to be gripped by the jaws or holding means of a tool holder or chuck, has at least one magnet disposed to be exposed to the ends of the elongated member, the magnet is disposed and adapted to simultaneously to attract the retaining means of second tool elements, hold two working bits, attract the band drill machine at one end and selected objects on the other end of the fist element.

In another preferred embodiment a second tool element is provided that slides over the first element of a tool system and is adapted to receive torque forces from the chuck of the drill machine.

In one embodiments the second tool element is equipped with tongues or prongs that are adapted to receive torque forces from the jaws and synergistically act as magnetically attractable retaining means.

In another preferred embodiment the outer surface of the first element for a tool system is shaped to transmit torque forces to a second tool element, and the second tool element is adapted to receive torque forces from the first element for a tool system and has means to be retained or locked on the first element for a tool system.

In another preferred embodiment of the invention the functioning of the retaining or locking means of the second tool element is at least in part helped by the action of the magnet of the first element of a tool system In one embodiment of the second tool element, the retaining means that is magnetically assisted is at least one tongue or prong.

In another embodiment the retaining means that is magnetically assisted is a sap-in ball.

In another embodiment of the second tool element the retaining means is a magnetically activated loose washer.

In another preferred embodiment there is provided a third adaptor element that has a deep or through hole and is adapted to fit into —and to receive torque from— a chuck and is adapted to receive the first element of a tool system inside the deep hole and to transmit torque forces from the chuck to the first tool element.

In another preferred embodiment the third adaptor element has a cylindrical or round hole and at least one T-shaped slot that engages at least one pin on a first element of a tool system that,—upon rotation—, locks, and together with a magnet synergistically serve as retaining and torque transferring means.

In another embodiment the deep hole of the third adaptor element is of non-circular or hexagonal cross section and can transfer torque forces to a first element of a tool system that has a non circular or hexagonal shaped cross section.

In another embodiment the third adaptor element has retaining means in the form a ball and sliding sleeve arrangement to positively hold a first element of a tool system.

In another embodiment the magnet of the first element of a tool system is an electro-magnet, that either automatically works during the rotation a hand drill or is triggered separately and allows the operator to selectively activate the magnetically attractable retaining means of the various elements of this invention.

Another embodiment of the invention is an electric hand drill machine equipped to selectively transmit electrical current to a first element of a tool system with an electro-magnet.

Another preferred embodiment is the combination of two or three of the disclosed elements of a tool system.

These and other advantages of the present invention will be apparent in the following description:

BRIEF DESCRIPTION OF THE DRAWINGS

The invention is illustrated by way of example in the following drawings, wherein.

DESCRIPTION OF THE PREFERRED EMBODIMENTS

Figure 1:
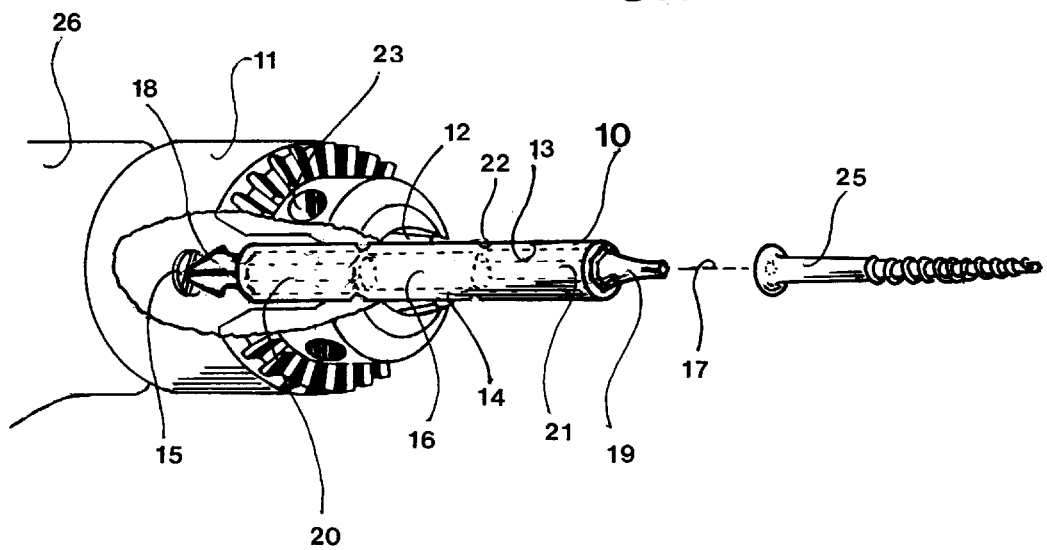
FIG. 1 is a perspective, partially cutaway view of an element of a tool system in a chuck.

Referring now in detail to the drawings.
In FIG. 1 is shown a first element for a tool system 10 held in tool holder or chuck 11 by means of jaws 12 that are the holding means able to transfer torque and lateral forces to the outer surface 13 of elongated member 14 of element 10. Elongated member 14 of this embodiment and those in the following illustrations are understood to be made from a the non-magnetic materials such as stainless steel well known to those skilled in the art. The chuck 11 is fastened to a hand drill machine 26 by screw 15 that is a steel component magnetically attractable to magnetic forces emanating from a magnet 16 and projected at this point along the axis of rotation 17 to working tools or bits 18 and 19. The bit 18 is a countersink with the customary ¼" hex shank that is held in cavity 20 at one end of the elongated member 14, whereas the working tool 19 is a screw driver bit held in cavity 21 at the other end of elongated member 14. Central magnet 16 is shown to be a single unit, but could be made up of several segments, depending on the magnetic strength requirements. Central magnet 16 and cavities 20 and 21 are adapted to favor direct contact between magnet 16 and the bits 18 and 19 or any other selected working tools. Magnet 16 is seen to be secured internally in elongated member 14 by compression forces generated by pressure resulting from the creation of optional indentations 22 in outer surface 13. Indentations 22 can synergistically serve as grip portions for the retaining means of further second tool elements. It is known to those skilled in the art that magnetic force lines are approaching a direction normal to the axis of rotation 17 near the poles of magnet 16, creating the strongest inward forces near that area at the ends of the magnet 16. It is preferred that indentations 22 align with locations where magnetic force lines are normal to the axis of rotation 17. Holes 23 are co-rotating with chuck 11, are part of its' tightening means and are together with jaws 12 parts of the chuck that are useful for transferring forces to further second tool elements. A wood screw 25 is an example of an object that might be attracted simultaneously together with machine screw 15 by the action of magnet 16. Working tools such as counter sink 18 or taper drills (shown later) do normally not resist removal from a drilled hole, and the force of magnet 16 should be sufficient to hold them in cavity 20 during the whole reaming operation, including the withdrawal.

Figure 2:
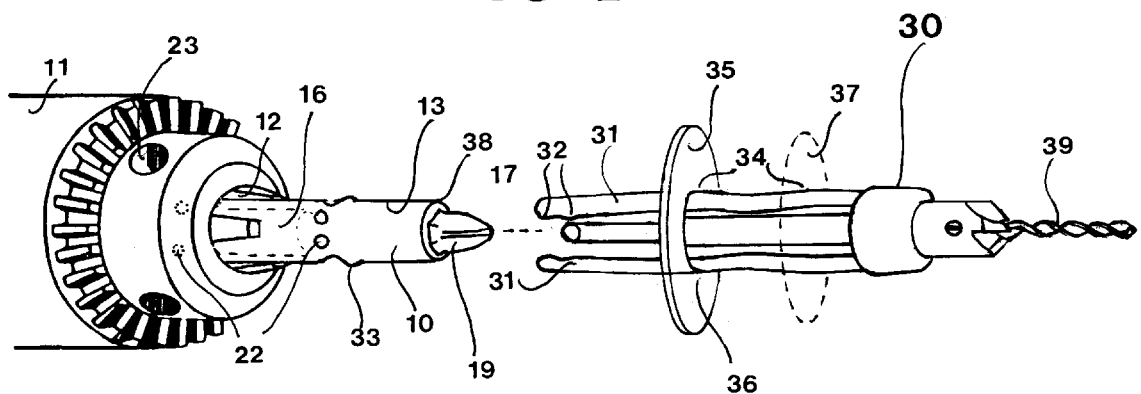
FIG. 2 is a perspective view of the combination of two elements of a tool system.

In FIG. 2 is shown second tool element 30 that is adapted to enter in a sliding fit over the outer surface 13 of first element of a tool system 10. Second tool element 30 has a drill 39 on one end and tongues 31 on the other end Prongs 31 are disposed on second tool element 30 substantially parallel to axis of rotation 17 and are the retaining mans to selectively lock second tool element 30 on first element 10 and synergistically serve as the means to receive torque forces from jaws 12. At least one of tongues 31 is seen to be provided with optional protrusions 32 that are adapted to selectively engage the outer surface 13 at optional indentations 22 or surface protrusions 33. The prongs 31 are made from a magnetically attractable material such as mild steel and accordingly their contact with surface 13 is facilitated or assisted at this point by the action of magnet 16. While the dimensions of optional indentations 22, surface protrusion 33 or protrusions 32 are shown to be substantial, it is understood by those skilled in the art that they can have various dimensions and that even microscopic surface roughness significantly increases the coefficient of friction which allows the second tool element 30 to be retained on elongated member 14 during work. Tongues or prongs 31 are seen to have raised portions 34 that allow sliding ring 35 to selectively exert a force away or toward the axis of rotation 17. Sliding ring 35 is shown in locking position 36 where prongs would be near magnet 16. In position 37 ( shown in phantom lines), ring 35, during removal of second tool element 30, would exert a lifting force away from the axis of rotation 17 on the free ends of prongs 31 having protrusions 32, this by lever action about the fulcrum that is formed by contact area 38. It is apparent that prongs 31 can also be adapted to pass external of chuck and selectively engage holes 23. These, like jaws 12 are co-rotating with the drill machine and are useful to impart rotation or torque forces to element 30. It can be seen that in this combination the magnet 16 fulfills 5 synergistic functions. First, it holds simultaneously 2 removable bits 18 and 19. Secondly, the element 10 is magnetically held in chuck 11. Thirdly, it attract and holds second element 30 along axis of rotation 17 and fourth, it pulls on retaining means 31 in a direction toward the axis of rotation 17. A fifth function occurs when fastener 25 or any other magnetically attractive object such as a version of second tool element 30 is selectively held, near bit 18 and is lifted at the operators convenience. It is apparent of course that the tongues 31 define a cavity with hexagonal cross section and that second tool element will also function with a hexagonal shaped first element shown in the next drawing.

Figure 3:
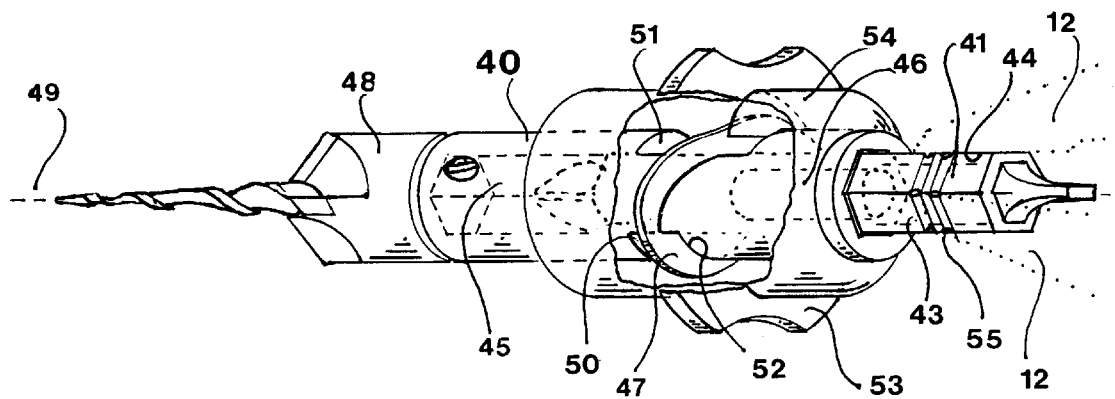
FIG. 3 is a perspective partial cut-away view of the combination of two elements of a tool system.

In FIG. 3 is illustrated a version of second tool element 40 that is shown to slide over first element for a tool system 41, one that is similar to the previously shown first element 10. However in this embodiment the elongated member 43 is seen to be of hexagonal cross section, so that the outer surface 44 has the means to transmit torque forces to the second tool element 40. Jaws 12 (shown partially and in phantom lines), hold one end of first element of a tool system 41. The torque forces from jaws 12 are thus transmitted from the hand drill to second tool element 40. This is accomplished by hexagonal cavity 45 seen in phantom lines, that is second tool elements' means to receive torque forces from first element 41. Aligned with magnet 46 is curved and loose washer 47 that is the retaining or locking means of second tool element 40, designed to block removal of it from first element 41 when pull is exerted on working tool 48. Such pull and resistance is frequently experienced when a deep pilot hole is drilled in hard wood. Pivoting washer 47 straddles in a loose fit the outer surface of second tool element 40. Magnetic forces acting at various angles to axis of rotation 49 are understood to help move curved washer 47 into a position that is as far away from normal to axis of rotation 49 as play in notches or holes 50 and 51 allows. Holes 50 and 51 are seen to reach into the hex cavity 45 and make contact with outer surface 44 of first element 41and washer 47 possible. In such a magnetically induced screwed position of the retaining means or washer 47, interlocking of elongated member 43 and second element 40 occurs. This retaining or locking is facilitated when the rim 52 of notch 50 urges curved washer 47 along when second tool element 40 is pulled in the direction toward tool 48. A sliding ring 53 is designed to touch washer 47 near notch 51 and serves to override the action of magnet 46 and thereby allow the moving of washer 47 into a position more or less normal to the axis of rotation 49, thereby freeing second tool element 40. Sliding ring 53 can be an intregal part of cover 54 that shields the curved washer 47. It is evident that the washer 47 will be pulled into the ready-to-lock position by the action of magnet 46 and then fully locked by any pulling action on working tool 48. This magnetically actuated design reduces the retaining or locking mechanism to as little as two moving parts, a hundred percent improvement over the prior art devices. Indentations 55 in outer surface 44 are an optional feature to engage washer 47 in selected positions with outer surface 44. They have proven useful in making the locking retaining means less vulnerable to the results of wear.

Figure 4:
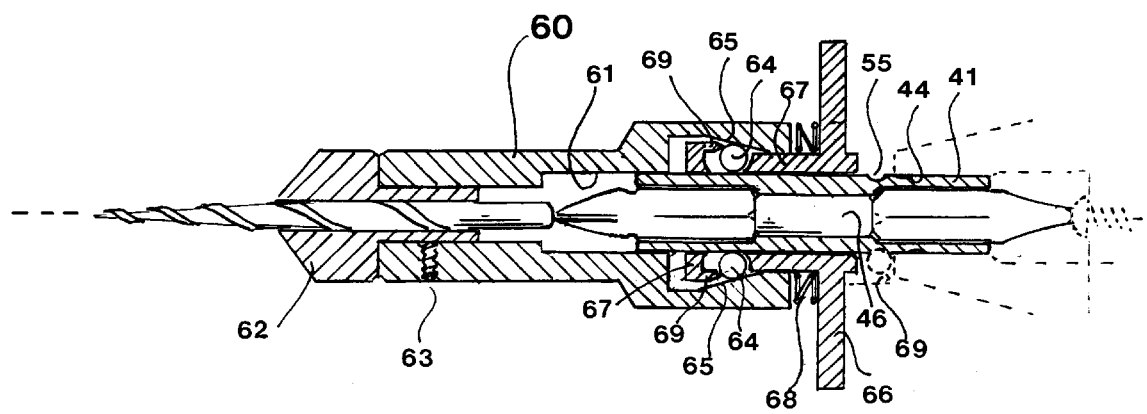
FIG. 4 is a sectioned view of the combination of two elements of a tool system held in a chuck.

In FIG. 4 is illustrated the second tool element 60 in combination with first element for a tool system 41. The outer surface 44 is adapted to enter in a sliding fit hexagonal cavity 61, that holds in its ¼" hex hole portion the working tool 62 secured by set screw 63. The second tool element 60 has as principal retaining or locking means balls 64 that could be aided in their contact with surface outer 44 by magnet 46. Part of the interior cavity 61 is conically shaped, defining sloping portion 65. The balls 64 are held in a loose fit in second tool element 60 in such a way that movement of surface 44 either loosens or tightens the balls 64 as they either roll freely or are jammed between outer surface 44 and slope 65. A sliding ring 66 has extension 67 that communicates with the balls 64 and allows the operator to free the jammed balls 64 by pulling ring 66 toward the working tool 62. An optional spring 68 would keep extensions 67 from interfering with contact between balls 64, slope 65 and outer surface 44. It is apparent that through the use of indentations 55 on surface 44, with a ball-type retaining or locking means, the sloping portion 65 could be dispensed with and that the balls 64 could be held in the indentations 55 by a structure equivalent to the optional lip portion 69. When sliding ring 66 is pulled in a direction fully away from tool 62, lip or ring structure 69 would positively lock balls 64 near magnet 46 in indentations 55, as is shown in separate phantom lines. In either case the disclosed invention provides many synergistic actions of the cooperating parts.

Figure 5:
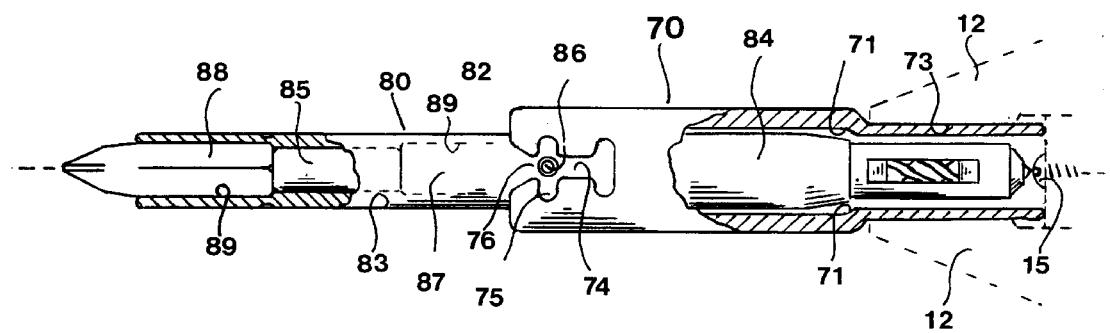
FIG. 5 is a partially cut-away view of two elements of a tool system in a chuck and FIG. 6 is a partial cut-away view of a parts of a hand drill and three tool elements.

In FIG. 5 is shown the combination of an adaptor element 70 with the first element of a tool system 80. Third adaptor element 70 has deep cavity 71 that allows it to accept in a sliding fit the outer surface 83 of elongated member 82. Cavity 71 is seen here to be an end-to-end round hole and reach fully into Chuck 11, allowing access to magnetically attractable screw 15 by tool bit 84. However, in another, here not shown, version of cavity 71, for structural reasons for example, a thin wall (not shown) could be left at the end to allow tool bit 84 to butt against. In either case, cavity 71 reaches deep into the chuck 11. Screw 15 is part of a drill machine (not fully shown). Jaws 12 (shown partially and in phantom lines) grip outer surface 73 and are used to transfer torque forces. Optionally, outer surface 73 could be a prism with hexagonal cross section or have three or six lengthwise indentations to both strengthen the walls and favor torque transfer from jaws 12 to third adaptor element 70. In this illustration, tool bit 84 is the well known self centering "VIX" bit developed by the S.E. Vick Tool Co. of Lakeville Minn. Its hex shaft 87 and also the screw driver bit 88 are held by magnet 85 that is exposed to the two "hex" end cavities 89 of second tool element 80. Like counter sink 18, the VIX bit 84 does not require fastening by a set screw, since its penetrating drill bit is spring-loaded, which will extract itself from the drilled hole by spring pressure alone. However, because of its' considerable length, the VIX bit normally projects excessively from the solid-shafted holders of the prior art, contributing to its wobble. In the here disclosed hollow third adaptor element 70 with its deep or full length end-to-end cavity 71, the longer drills, such as the VIX bit 84, are accommodated with at least 50% reduction in overall length. Added to this is the convenience of being able to easier clean the through hole 71 of accumulated debris and of course being able to reverse the ends of unit 80 without having to loosen or tighten the Chuck 11. While the central magnet 85 provides magnetic forces that hold first element for a tool system 80 inside chuck 11, more positive locking of first element for a tool system 80 is provided during drilling and withdrawing by the pin 86 on outer surface 83. Other pins might be provided, but are not visible in this rendering. Pin 86 as retaining or locking means is designed to cooperate with the T-shaped slot 74 in the wall of third adaptor element 70. More than one slot 74 might be provided to match the number of pins 86. It is seen that upon rotation of chuck 11, pin 86 will be forced into niches 75 which thereby become the retaining or locking means of third adaptor element 70. Pins 86 will be urged to remain there during forward or reverse operation of the machine.

Synergistically, niches 75 are the means to transfer torque forces from third tool element 70 to first element for a tool system 80. Pin 86s easily slides out of slot 74 via passages 76 when the machine is at rest. Alternately passage 76 would also transfer torque forces to pin 86. More than one niche 75 is seen to be provided staggered in the parallel to axis of rotation 49, this to accommodate the difference in length of various bits such as 84 and 88 and yet reach close to the magnetically attractable screw 15. It is evident that the other retaining or locking means disclosed in this invention could be adapted and disposed on third tool element 70 to replace the function of the shown pin 86 slot 75—magnet 85 combination Such an alternate embodiment would be particularly useful if a hex female and hex male arrangement (not shown) is chosen for the cavity 71 and outer surface 83 respectively. It is further apparent that there is room on the free end of first element of a tool system 80 for modified versions of the previously described second tool element 30. Pin 86 would then synergistically transfer torque to prongs 31 Second tool element 40 could be adapted to this use by introducing an interior groove or key way that engages pin 86. In these (here not illustrated) combinations 3 working tools could be served by adapter element 70. Users of this invention are given accordingly the choice to combine at their convenience the various features to best suit their particular applications.

Figure 6:
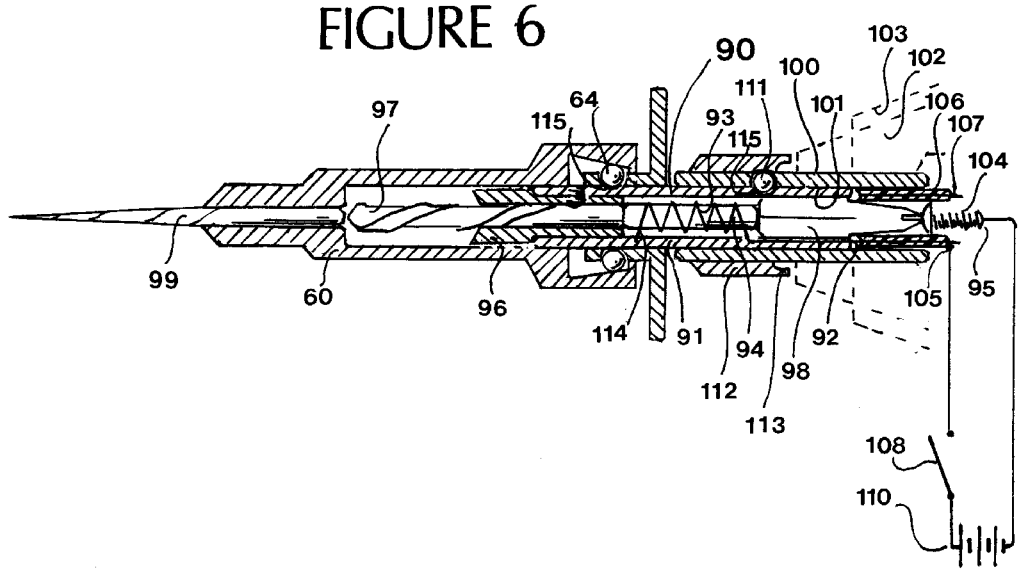

In FIG. 6 is shown first element of a tool system 90 slidingly fitting into third adaptor element 100. Its' through hole or deep cavity 101 has a hexagonal cross section and is the means to transfer forces to elongated member 91 with hexagonal outside cross section. It is apparent of course, that any non-circular cross section of cavity 71 and matching non-circular cross section of elongated member 91 would effectively serve as a means to transfer forces. As examples of such cross sections might be cited the square and star-shaped drivers used in the industry. Third adaptor element 100 is grasped or gripped by jaws 102, the holding means for tool holder or chuck 103 (both shown partially and in phantom lines). Machine screw 104 fastens chuck 103 to a hand drill machine (not fully shown). An insulated plastic bushing 106 has encased conducting ring 107 that receives current via sliding contact 105, and is exposed at its other end and inside chuck 103 to contact wire 92 of first element 90. Wire 92 has properly insulated portions and leads to coil 93 surrounding magnet core 94. The other terminal 114 of coil 93 is grounded with contact 95 via the joining metal components of the hand drill machine to a low voltage power supply or battery 110. As might be the case with a cordless drill, battery 110 might be the hand drills' rechargeable power pack. Switch 108 might be lied to the trigger switch that is actuating the rotation of the main motor, or be a separate, detached unit, useable only on command distinct from the action of hand drills' motor.(not shown). Clearance hole drill 97 is held in counter bore 96 by a set screw. Counter bore 96 and screw driver bit 98 are seen to be held in the ¼" hex cavity of elongated member 91. Static friction holds first element for a tool system 90 in the well fitting hex cavity 101 of third adaptor element 100. During drilling operations, a surge of direct current should energize and magnetize the core 94, causing it to powerfully attract both bit 98 and screw 104. Magnet core 94 and coil 93 are conceived to generate enough pull to overcome the resistance to withdrawal of drill 97 from a finished, drilled hole. Skilled operators always keep hand drills rotating while attempting to withdraw drills from their drilled holes, because dynamic friction is always less than static friction. Upon release of switch 108, and end of rotation of chuck 103, the operator can now easily, without having to cope with the magnetic force, proceed to put the screw driver 98 to work after rotating it to the front of the tool system. The electrical components of this illustration are not shown to proportion and only by using the appropriate symbols. It is believed that those skilled in the art are well capable to formulate workable systems using the here thus disclosed information. Third adaptor element 100 has an optional locking or retaining means in the form of ball 111 with which to positively retain second tool element 90. An optional sliding sleeve 112 is shown to depress ball 111 in the locked position. Lip or internal recess 113 on sleeve 112 serves to free ball 111 and its function was shown as optional structure 69 on second tool element 60. A version of the second tool element 60 with locking balls 64 is seen to be slid onto the free portion of elongated member 91. Element 60 carries the pilot hole drill 99 required to fully prepare a screw hole that was started by the use of counter bore 96. It can be seen that balls 64 and 111 will be strongly drawn into contact with elongated member 91 by the action of electro-magnet 94. Optional and previously described indentations 115 will enhance the resulting retaining action. The here shown combination of the first element for a tool system 90 held in third adaptor element 100, but in turn supporting second tool element 60, shows the versatility of this magnetic tool change system. It is obviously also that it will function without the optional hand-actuated positive locking means 112 or notches 75. The use of electro-magnet 94 further allows the operator to choose between quick but moderate retaining by magnetism alone, or positive locking by use of the ball and sleeve arrangements possible on both the second tool elements and third adaptor elements.

The herein shown few embodiments are but examples of the various ways in which the disclosed invention can be produced and used. The present invention shall be considered defined by the following claims:

What is claimed is:

1. In a first element of a tool system for working on objects, said element adapted for use in a tool holder or chuck, said tool holder having holding means or jaws to hold said first element of a tool system and to transfer forces to said first element, said holding means comprising tightening means, said tool holder being part of a drill machine and having a magnetically attractable portion, said first element having an axis of rotation and an elongated member disposed and centered around said axis of rotation, said elongated member having an outer surface comprising indentations and protrusions of various dimensions, said elongated member having two ends and cavities disposed on said ends, said cavities adapted and dimensioned to accept selected working tools and having means to hold said working tools and means to transmit forces to said working tools, the improvement comprising:

there being disposed inside said member and exposed to said cavities at least one magnet positioned and adapted to have simultaneously direct contact with both of said working tools and to transmit magnetic forces to said working tools held in said cavities, said magnet and elongated member adapted to transmit magnetic forces via either one of said working tools to the magnetically attractable portion of said tool holder while said first tool element is held by the jaws in said tool holder, said first element and magnet also adapted to project magnetic forces in selected locations in a direction substantial normal to said axis of rotation so as to attract magnetically attractable objects to said outer surface.

2. In combination a first element of a tool system as defined in claim 1 and a second tool element sharing said axis of rotation, said second tool element having a central cavity disposed along said axis of rotation said cavity dimensioned to accept said outer surface of the first tool elements' elongated member in a sliding fit, said second tool element having means to receive torque forces from said jaws or holding means, said means to receive torque forces also adapted to be attracted by said magnet of the first element and thereby to serve as retaining means or locking means for selectively retaining said second tool element on said first element of a tool system.

3. In combination a first element of a tool system as defined in claim 1, wherein the said outer surface of said elongated member has means to transmit forces and a second tool element having a central cavity aligned with said axis of rotation, said cavity comprising means to receive forces from said first element, said second tool element having retaining means or locking means to retain said second tool element on said first element, said retaining means having at least one magnetically attractive portion, said second tool element dimensioned to fit in a sliding fit over said elongated member and wherein said magnet is disposed in said elongated member so as to exert a pulling force directed toward said axis of rotation on said retaining means of the second tool element so as to help retain said second element on said elongated member.

4. The second tool element as defined in claim 3, wherein the said retaining means comprises at least one tongue or prong that is disposed on said second element substantially parallel to said axis of rotation and wherein said tongue has at least one portions spaced at an increased distance from said axis of rotation and wherein a sliding member is provided that is adapted to slide on said prong substantially parallel to said axis of rotation so as to increase and decrease pressure of said tongues on said outer surface of the first elements' elongated member.

5. The second tool element as defined in claim 3, wherein said retaining means comprises a pivoting member or washer with a hole dimensioned to admit in a loose fit said elongated member of said first element and to make contact at two points with said outer surface, said washer dimensioned and disposed on said second tool element in such a way so as to align with said magnet and to be pulled by said magnet into a position away from normal to said axis of rotation and said second tool element comprising a sliding member adapted to selectively tilt said washer into a position substantially normal to said axis of rotation.

6. A second tool element as defined in claim 3, wherein said retaining means comprises at least one ball adapted and dimensioned to selectively simultaneously touch said outer surface and said second tool element.

7. The second tool element as defined in claim 4, wherein said tongue is provided with means to selectively engage the indentations of said outer surface.

8. The second tool element as defined in claim 5, wherein said pivoting member is adapted to selectively engage the indentations of said outer surface of the elongated member.

9. The second tool element as defined in claim 6, wherein said ball is adapted and positioned to selectively engage the indentations of said outer surface of the elongated member.

10. In combination the first element of a tool system as defined in claim 3 and a third adaptor element of a tool system, said adaptor element dimensioned to slide into a tool holder or chuck and adapted to be grasped and receive forces from the jaws or holding means of said chuck, said third adaptor element sharing said axis of rotation with said first element and said chuck, said third adaptor element having a central cavity aligned with said axis of rotation, said central cavity having a cross section that is adapted and dimensioned to receive said elongated member in a sliding fit, said central cavity extending along said axis of rotation deep into said chuck when said jaws grip said third adaptor element, said third adaptor element comprising means to transfer forces to said first element.

11. The third adaptor element as defined in claim 10, wherein said means to transfer forces of the third adaptor element is at least one slot and wherein said means to transmit forces of said outer surface of the first elements' outer surface is at least one protrusion or pin that is adapted and dimensioned to be received in said slot.

12. The third adaptor element as defined in claim 10, wherein said means to transfer forces is said cavity and wherein said cross section is non-circular and wherein said outer surface conforms to said cross section that is non-circular.

13. The third adaptor as defined in claim 12, wherein said cross section defines a hexagon.

14. The third adaptor element as defined in claim 10 wherein said cavity is an end-to-end hole.

15. The combination of a first element of a tool system and a third adaptor element of a tool system as defined in claim 10, wherein said third adaptor element comprises retaining means to retain said first element, said retaining means adapted and dimensioned to engage said outer surface of the first elements' elongated member and said retaining means adapted to be assisted in their function by the action of said magnet.

16. The first element for a tool system as defined in claim 1, wherein said magnet is an electro-magnet and wherein said fist element has means to receive electric current.

17. The combination of the first element of a tool system as defined in claim 16 and a tool holder, wherein said tool holder comprises means to transmit electric current to said tool element and wherein said drill machine has means to provide electric current and a switch or means to selectively interrupt said electric current thereby allowing the operator to selectively activate said electro-magnet.

18. A hand held electric rotary machine with a tool holder adapted to hold a working tool, said tool holder comprising means to transfer electric current to said working tool, said machine having a source of electric current destined for said working tool and a switch or means to selectively interrupt the flow of said current from said source to said working tool.

\* \* \* \* \*